Feb. 17, 1931. S. W. KIRK 1,792,590
DUST COLLECTOR
Filed Aug. 3, 1928
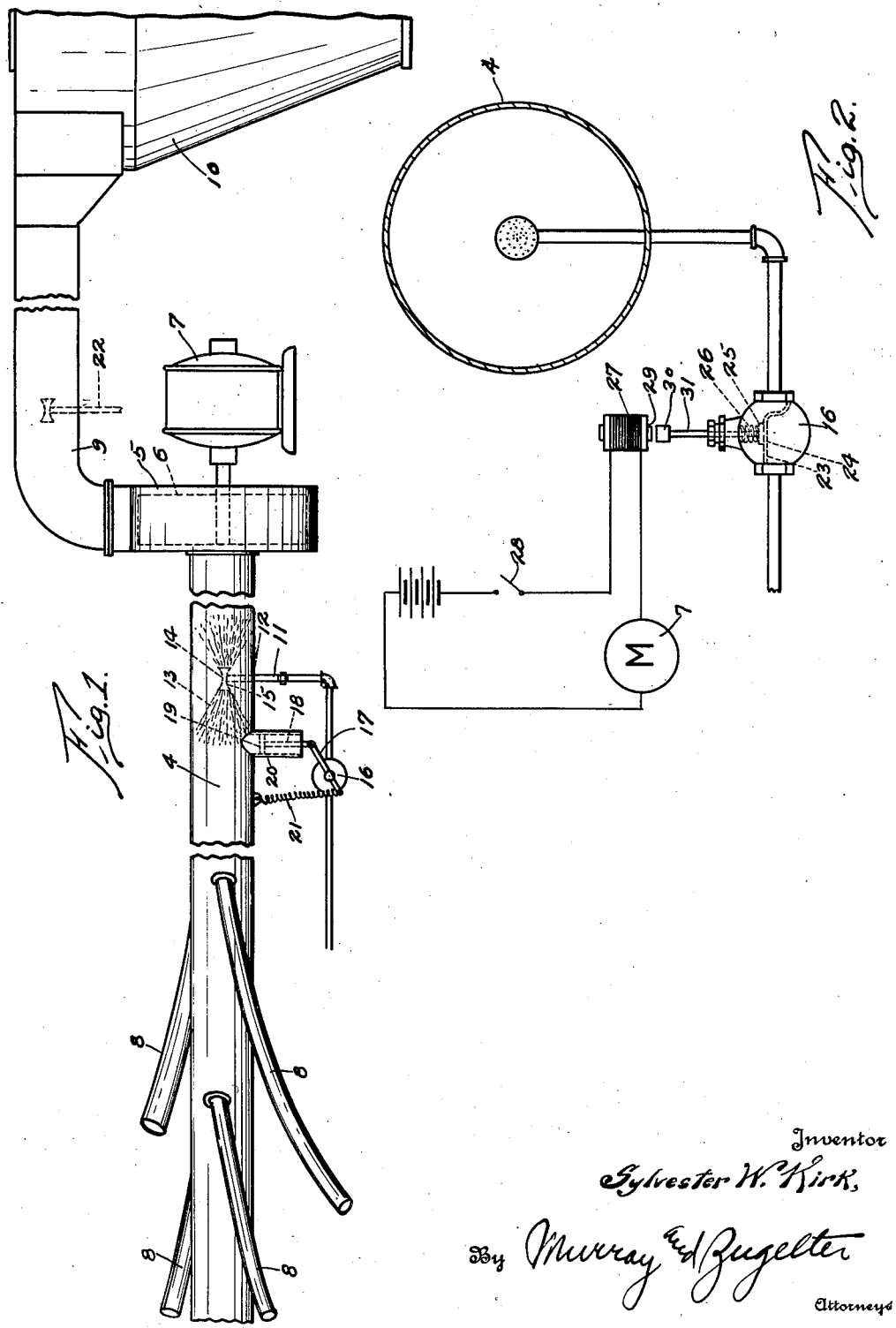
Inventor
Sylvester W. Kirk,
By Murray and Zugelter
Attorneys Patented Feb. 17, 1931

1,792,590

UNITED STATES PATENT OFFICE

SYLVESTER W. KIRK, OF CINCINNATI, OHIO, ASSIGNOR TO THE KIRK & BLUM MANUFACTURING COMPANY, OF CINCINNATI, OHIO, A CORPORATION OF OHIO

DUST COLLECTOR

Application filed August 3, 1928. Serial No. 297,221.

This invention relates to a collecting system for conveying waste material, such as dust and larger particles, of all kinds, and especially to the separation of dust from the air discharged into the atmosphere from such systems.

An object of the invention is to provide means for an ordinary collecting system to render more efficient any dust separator which may be used in connection therewith.

Another object is to provide means whereby moisture, preferably in the form of a finely divided spray or vapor, may be injected into the collecting or conveyor pipe, at an effective location, to combine with the lighter particles of waste material during their travel through the system to eliminate the problem of dust escape at the separator.

Another object is to provide means whereby the finely divided spray may be automatically controlled.

A further object is the elimination of elaborate and expensive structures and devices for removing dust from air in large quantities.

These and other objects are attained by the means described herein and disclosed in the accompanying drawings, in which:

Fig. 1 is an elevational view of a collecting system embodying the means of the present invention.

Fig. 2 is a cross sectional view of a modified form of the device.

In the art to which this invention pertains it is a well known fact that the disposition of the finely divided dust which usually accompanies other waste material conveyed from the various machines of a factory, has been a problem presenting considerable difficulty. Although various kinds of means have been used with some degree of success, it has been found that the air exhausted from systems equipped with such devices contains dust in quantities sufficient to render the surrounding atmosphere disagreeable and unhealthful. Attempts at wetting the dust as it issued from the separator were unsuccessful. By means of the device disclosed herein, the exhaust air may be cleansed and freed of practically all dust and like particles.

Dust resulting from the shaping and finishing of kiln dried lumber has heretofore been impossible to control. This comprises minute particles of infinitely thin, flat and irregular shapes and of relatively large surface area. Because of such large surfaces, the particles remain suspended in still air for a considerable time and have heretofore defied attempts to preclude their escape from separators of all kinds.

The present invention consists of means for introducing finely divided liquid into a pipe conveying a quantity of dust. The large surface areas of the dust particles are presumed to receive particles of moisture and combine thus at once increasing the weight of the particle and also breaking up or curling the particles so that there is less resistance to air. The particles are then easily controlled by an ordinary cyclone separator. In heretofore used systems, even when equipped with specially prepared separators, great quantities of the finely divided dust from hardwood working establishments can be seen emanating from the separators in a form not unlike smoke, the cloud-like masses taking the color of the material operated upon. If such a system is improved by adding to it the simple structure of this invention, the smoke-like emanations may be seen to disappear and reappear as the moisture or spray is introduced and shut off. Water is the most inexpensive liquid for the purpose as it may be supplied in various forms and from various sources such as an ordinary supply pipe or from exhaust steam.

Fig. 1 discloses a collecting system of an approved type, in which is installed the spraying means and an automatic control therefor.

The device comprises a suitable conveyor conduit 4 connected to a housing 5 supporting a fan 6 which draws air through the conduit 4. The fan is driven by means of an electric motor 7. Conduit 4 is provided at intervals with branch pipes 8 for connection with various machines of a factory or like establishment, for conveying dust and waste material therefrom. Connected to the fan housing is a discharge conduit 9 through which waste material may be conveyed to a separator 10 of any suitable type. The separator may discharge the waste into a boiler or other place of disposal of waste material, if desired. The air escapes into the atmosphere from the top of the separator in the usual manner.

Means is provided for injecting into the conduit 4 a spray of water or other liquid indicated by 13. Said means comprises a pipe 11 extending into the conduit 4 through an opening 12 disposed at a distance from the fan housing 5. The pipe is provided at its free end 14 with a nozzle 15 suitably constructed to emit a spray. The nozzle if desired may be so constructed as to emit a spray in various directions, as shown in Fig. 1.

Automatic control of the water spray is attained by means of a valve 16 having a valve lever 17 which is pivotally mounted upon a piston rod 18. Upon the free end of piston rod 18 is secured a plunger 19 slidably fitted within a cylinder 20 having communication with the conduit 4. It should be clear that the plunger will assume various positions within the cylinder 20 as the pressure in the conduit increases or decreases. If necessary a spring 21 may be utilized for urging the valve toward the closed position. It is to be understood that any type of valve suitable for such use may be employed for controlling the flow of water through pipe 11. At 22 the spray is shown located in the discharge conduit 9. This location shown at 12 however is more effective because of the mechanical churning of moisture and dust in the fan chamber.

In Fig. 2 is shown an electrical means for actuating the valve 16. The valve of Fig. 2 is provided with a dividing wall 23 provided with a seat 24 upon which a valve disk 25 may seat for cutting off the flow of water through the valve. A spring 26 urges the valve toward the seat 24. Numeral 27 indicates an electro-magnet connected in series with a motor 7 whereby the magnet remains energized so long as the switch 28 to the motor is closed. The core 29 of the electro-magnet 27 attracts an armature 30 mounted upon the stem 31 of valve 16. It should be noted that when the switch 28 is open for stopping the motor 7, the electro-magnet will be de-energized thereby permitting spring 26 of the valve to return the valve to closed position.

The pipe 11 is preferably placed in the conduit a few feet ahead of the fan. Power is conserved and efficiency of operation increased by introducing the spray of water or moisture adjacent the fan casing. Although a particular type of valve and control therefor are disclosed in the accompanying drawings, it is to be understood that various types of valves and control mechanisms therefor may be employed. It is possible to make various changes in the structural detail of the device without departing from the spirit and scope of the invention as set forth in the claims.

What is claimed is:

1. In a device of the class described the combination of a conduit for conveying material including finely divided particles, means for producing movement of air in the conduit, a discharge conduit, a water supply pipe extending into one of the conduits, a spray nozzle on the supply pipe, a valve for the control of water passing through the pipe and means associated with the air moving means for actuating the valve.

2. In a device of the class described the combination of a conduit for conveying material including finely divided particles, means for producing air movement in the conduit, a separator, a discharge conduit providing communication from the first conduit to the separator, a source of water supply, spray means extending from the source of water supply into the discharge conduit, a valve for controlling the water supply, and means for automatically actuating the valve.

3. In a device of the class described the combination of a conduit for conveying material including finely divided particles, a fan, a separator, a discharge conduit providing communication from the first mentioned conduit to the separator, a source of water supply, spray means extending from the source of water supply into the discharge conduit, a valve for controlling the water supply, and electrically controlled means for actuating the valve.

4. In a device for collecting the waste products from kiln dried lumber and other waste products containing air floating particles the combination of a conduit system means for effecting velocity air movement therethrough for conveying such waste products, a mechanical separator for removing heavier particles of the waste material and means arranged to operate, upon operation of the air moving means to apply a moisture medium to the material as it moves through the system whereby air floating particles are conditioned during their movement through the system for effective removal by the separator.

5. In a device of the class described the combination of a conduit for conveying material including finely divided particles, electric motor operated means for producing movement of air in the conduit, a discharge conduit, a water supply pipe extending into one of the conduits, a spray nozzle on the supply pipe, a valve for the control of water passing through the pipe and means operable upon completing electrical connection to the motor, for actuating the valve.

In testimony whereof, I have hereunto subscribed my name this 20th day of July, 1928.

SYLVESTER W. KIRK.